(12) United States Patent
Ashbrook et al.

(10) Patent No.: US 9,304,010 B2
(45) Date of Patent: Apr. 5, 2016

(54) METHODS, APPARATUSES, AND COMPUTER PROGRAM PRODUCTS FOR PROVIDING BROADBAND AUDIO SIGNALS ASSOCIATED WITH NAVIGATION INSTRUCTIONS

(71) Applicant: Nokia Technologies Oy, Espoo (FI)

(72) Inventors: Daniel Ashbrook, Sunnyvale, CA (US); Kenneth McClure, Dallas, TX (US)

(73) Assignee: Nokia Technologies Oy, Espoo (FI)

( * ) Notice: Subject to any disclaimer, the term of this patent is extended or adjusted under 35 U.S.C. 154(b) by 246 days.

(21) Appl. No.: 13/780,504

(22) Filed: Feb. 28, 2013

(65) Prior Publication Data
US 2014/0244265 A1  Aug. 28, 2014

(51) Int. Cl.
G10L 21/00 (2013.01)
G10L 13/00 (2006.01)
G01C 21/36 (2006.01)

(52) U.S. Cl.
CPC .................................. G01C 21/3629 (2013.01)

(58) Field of Classification Search
None
See application file for complete search history.

(56) References Cited

U.S. PATENT DOCUMENTS

| 7,937,667 | B2 * | 5/2011 | Kramer et al. | 715/781 |
|---|---|---|---|---|
| 8,904,308 | B2 * | 12/2014 | Kramer et al. | 715/810 |
| 2008/0306682 | A1 * | 12/2008 | Dorfstatter et al. | 701/207 |
| 2010/0017205 | A1 * | 1/2010 | Visser et al. | 704/225 |
| 2010/0234071 | A1 * | 9/2010 | Shabtay et al. | 455/562.1 |
| 2011/0286605 | A1 * | 11/2011 | Furuta et al. | 381/71.1 |
| 2012/0166186 | A1 * | 6/2012 | Acero et al. | 704/205 |
| 2012/0209611 | A1 * | 8/2012 | Furuta et al. | 704/268 |
| 2013/0138434 | A1 * | 5/2013 | Furuta et al. | 704/226 |
| 2014/0206308 | A1 * | 7/2014 | Hatton | H04W 4/22 455/404.2 |
| 2014/0280439 | A1 * | 9/2014 | Hatton | H04L 67/12 709/201 |
| 2014/0358525 | A1 * | 12/2014 | Acero et al. | 704/201 |
| 2015/0245190 | A1 * | 8/2015 | Hatton | H04W 4/22 455/404.2 |

FOREIGN PATENT DOCUMENTS

EP       1225551       7/2002

OTHER PUBLICATIONS

Guosui, L., et al.; "*The Development of Random Signal Radars;*" IEEE Transactions on Aerospace and Electronic Systems, vol. 35, No. 3; dated Jul. 1999.
"*White Noise;*" Wikipedia; retrieved on Jan. 17, 2013 from <http://en.wikipedia.org/wiki/White_noise>.

* cited by examiner

*Primary Examiner* — Satwant Singh
(74) *Attorney, Agent, or Firm* — Alston & Bird LLP

(57) ABSTRACT

Methods, apparatuses, and computer program products are herein provided for providing broadband audio signal navigation instructions. A method may include determining a broadband audio signal associated with at least one navigation instruction. The method may further include causing the broadband audio signal to be provided to the user. The broadband audio signal may be a representation of an audio signal with components in all frequencies capable of being at least one of perceived or broadcast by a speaker. Corresponding apparatuses and computer program products are also provided.

17 Claims, 15 Drawing Sheets

METHODS, APPARATUSES, AND COMPUTER PROGRAM PRODUCTS FOR PROVIDING BROADBAND AUDIO SIGNALS ASSOCIATED WITH NAVIGATION INSTRUCTIONS

TECHNOLOGICAL FIELD

An example embodiment of the present invention relates generally to user interface technology and, more particularly, relates to methods, apparatuses, and computer program products for providing broadband audio signals associated with navigation instructions.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

With increased functionality, mobile computing devices can be used to perform a variety of functions. For example, some mobile computing devices may be configured to function as a navigation system that provides geographical and/or travel information for a user, such as providing directions to the user.

BRIEF SUMMARY

Unfortunately, however, a navigation function often provides audio or visual navigation instructions that can be distracting to a user. For example, it may be dangerous for a user to glance at a navigation screen to receive a visual navigation instruction when the user is attempting to drive while navigating a route. Likewise, the user may be distracted from what they are listening to (e.g., traffic, alerts, music, etc.) when an audio navigation instruction is broadcast.

As such, example embodiments of the present invention seek to provide navigation instructions with limited distraction to the user. In some embodiments, a user may receive an indication of a navigation instruction in a way that allows the user to understand the navigation instruction without being distracted from their current task. Along these lines, some embodiments of the present invention relate to methods, apparatuses, and computer program products for providing broadband audio signals associated with navigation instructions.

In one example embodiment, a method includes determining a broadband audio signal associated with at least one navigation instruction. The method further includes causing the broadband audio signal to be provided to the user. In some embodiments, the broadband audio signal comprises a representation of an audio signal with components in all frequencies capable of being at least one of perceived or broadcast by a speaker. In some embodiments, the method may include determining the broadband audio signal by determining the broadband audio signal from a plurality of broadband audio signal candidates.

In some embodiments, the method may include determining the broadband audio signal associated with the navigation instruction by, in an instance in which the navigation instruction comprises a continue on the current path instruction, determining a white noise signal. In some embodiments, the method may include determining the broadband audio signal associated with the navigation instruction by, in an instance in which the navigation instruction comprises a turn instruction, determining one of a pink noise signal or a blue noise signal.

In some embodiments, the method may include determining the broadband audio signal associated with the navigation instruction by, in an instance in which the navigation instruction comprises a turn in a predefined direction instruction, determining a pink noise signal. Additionally, in some embodiments, the method may include determining the broadband audio signal associated with the navigation instruction by, in an instance in which the navigation instruction comprises a turn in a second predefined direction instruction, determining a blue noise signal.

In some embodiments, the method may include causing the broadband audio signal to be provided to the user by causing the broadband audio signal to be provided based at least in part on a distance between the user and a location associated with the navigation instruction. Additionally, in some embodiments, the method may include causing the broadband audio signal to be provided to the user by causing the broadband audio signal to be provided at a volume level proportional to the distance between the user and the location associated with the navigation instruction.

In some embodiments, the method may include determining a second broadband audio signal associated with at least one second navigation instruction. Additionally, the method may include causing a transition from the broadband audio signal being provided to the user to the second broadband audio signal being provided to the user. Additionally, in some embodiments, the method may include causing the transition by causing the transition from the broadband audio signal being provided to the user to the second broadband audio signal being provided to the user at a transition rate proportional to a distance between the user and a location associated with the second navigation instruction.

In some embodiments, the method may include determining a second broadband audio signal associated with the navigation instruction. Additionally, the method may further include causing a transition from the broadband audio signal being provided to the user to the second broadband audio signal being provided to the user.

In some embodiments, the at least one navigation instruction may be associated with a first broadband audio signal and a second broadband audio signal.

In some embodiments, the method may further include causing at least one audio navigation instruction associated with the navigation instruction to be provided to the user concurrent with causing the broadband audio signal to be provided to the user.

In some embodiments, the method may further include causing at least one audio navigation instruction associated with the navigation instruction to be provided to the user. Additionally, the method may further include causing the broadband audio signal to cease to be provided to the user concurrent with causing the at least one audio navigation instruction to be provided to the user.

In some embodiments, the method may further include causing at least one visual navigation instruction associated with the navigation instruction to be provided to the user concurrent with causing the broadband audio signal to be provided to the user.

In another example embodiment, an apparatus comprises at least one processor and at least one memory storing computer program code with the at least one memory and stored computer program code being configured, with the at least one processor, to cause the apparatus to determine a broadband audio signal associated with at least one navigation instruction. The at least one memory and stored computer program code are configured, with the at least one processor, to further cause the apparatus to cause the broadband audio signal to be provided to the user.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method including determining a broadband audio signal associated with at least one navigation instruction. The method further includes causing the broadband audio signal to be provided to the user.

In another example embodiment, an apparatus is provided. The apparatus comprises means for determining a broadband audio signal associated with at least one navigation instruction. The apparatus further comprises means for causing the broadband audio signal to be provided to the user.

BRIEF DESCRIPTION OF THE DRAWINGS

Figure 1:
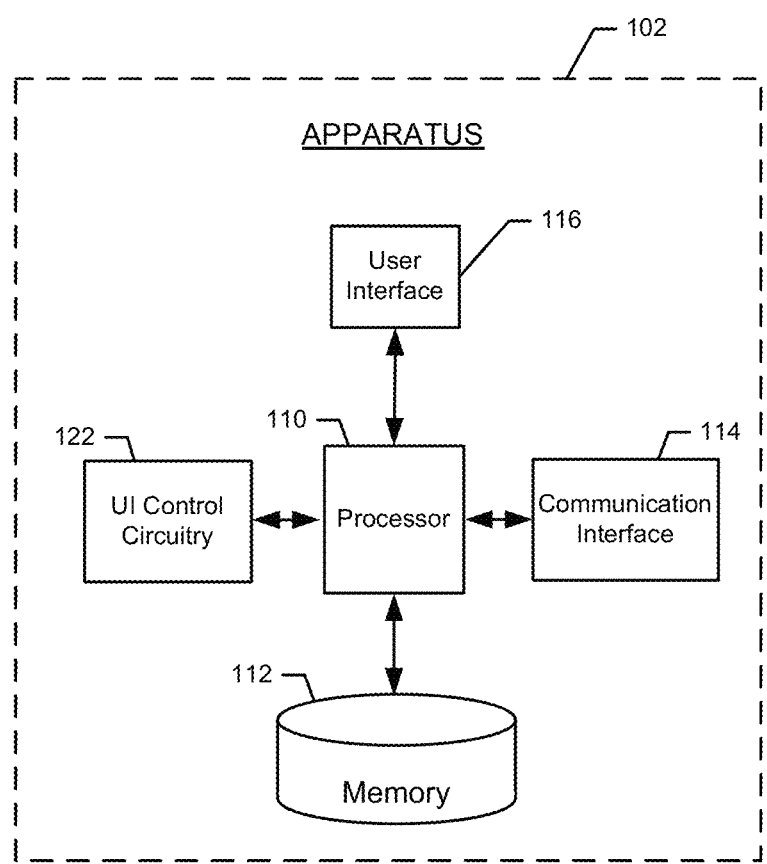
Figure 2:
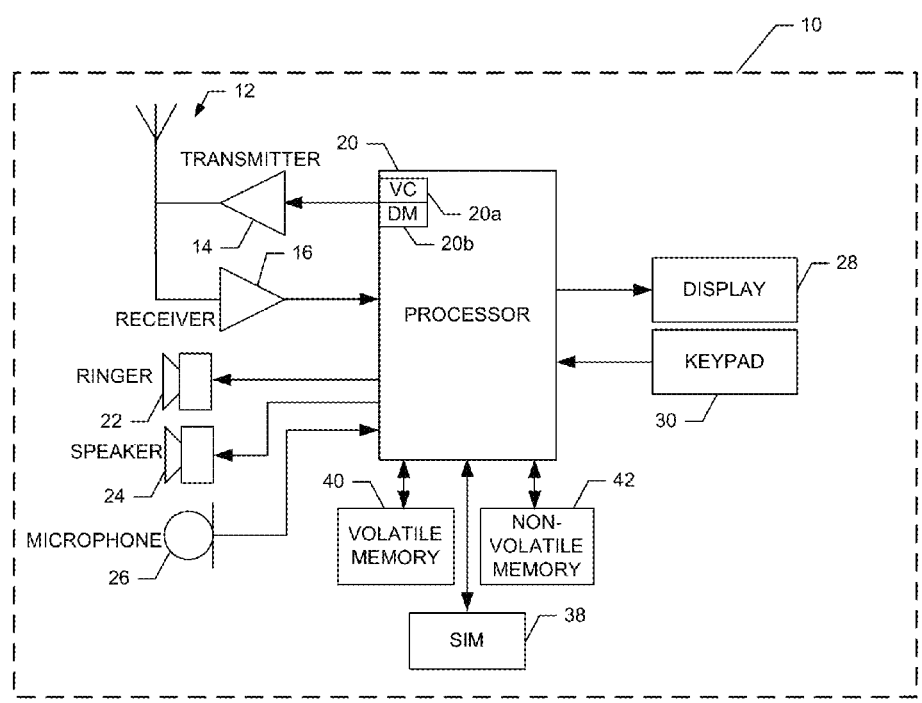
Figure 3:
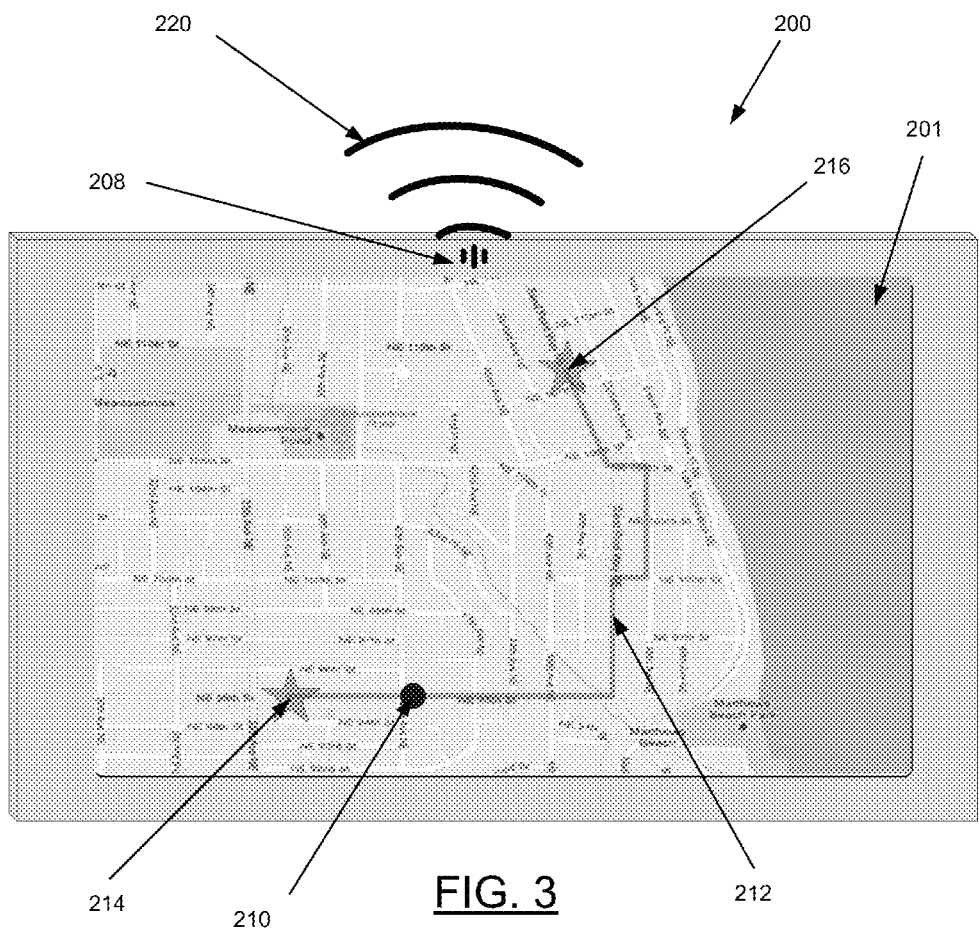
Figure 4A:
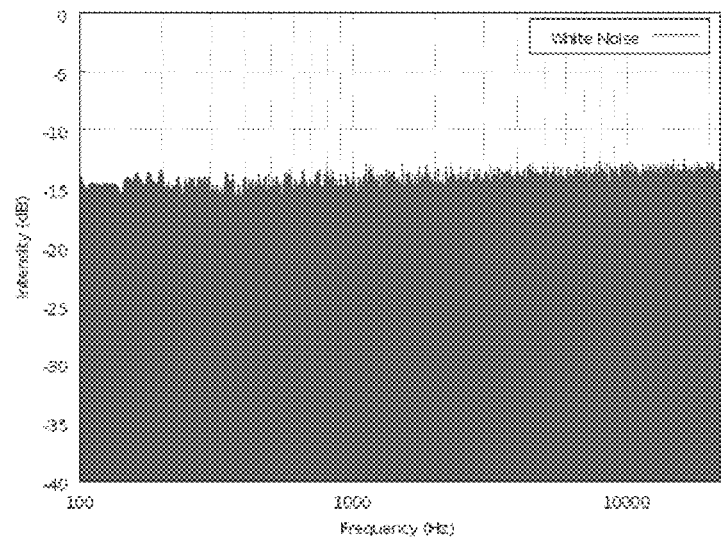
Figure 4B:
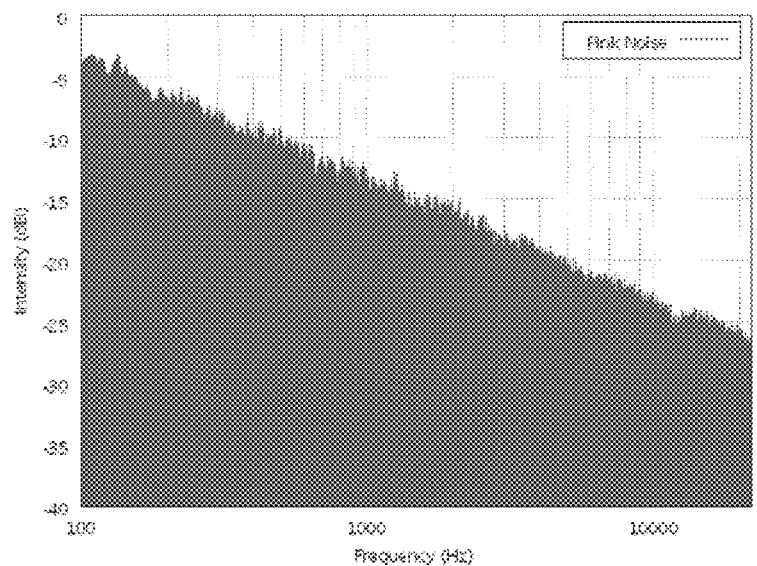
Figure 4C:
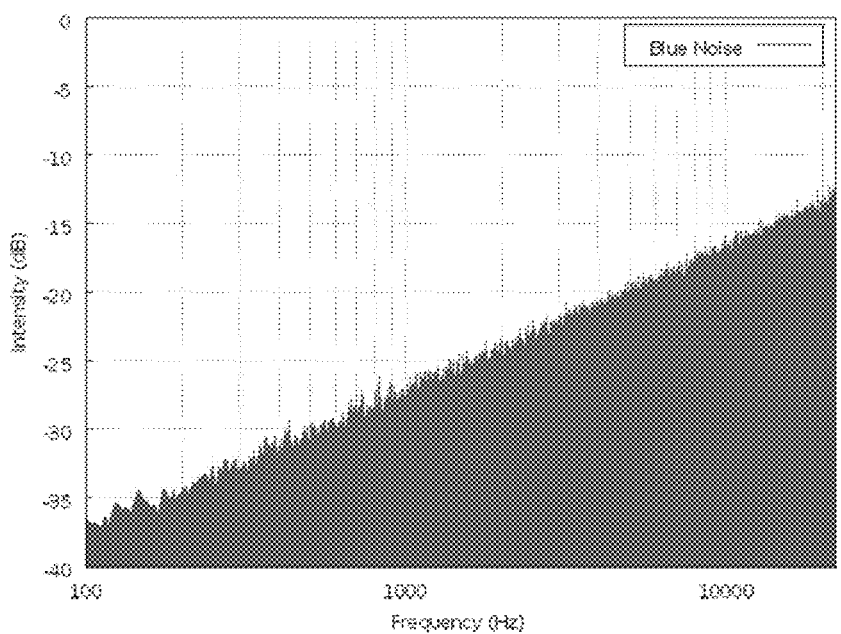
Figure 5:
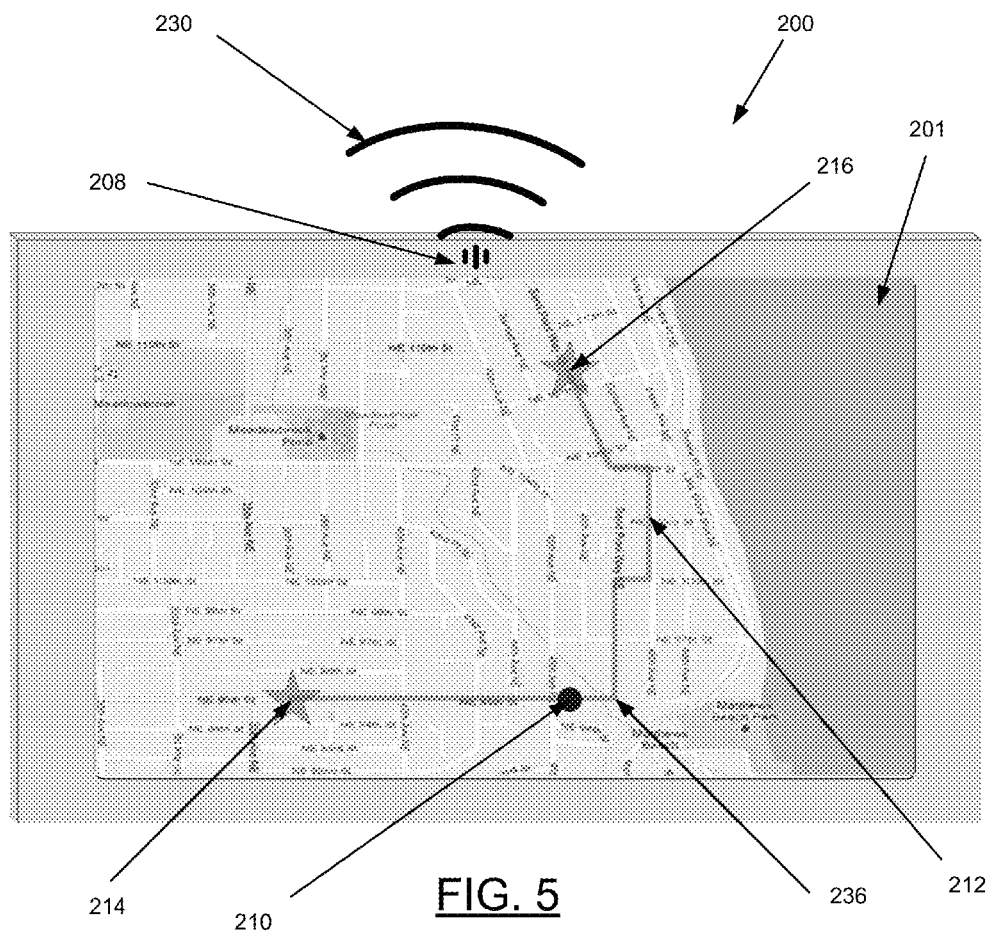
Figure 5A:
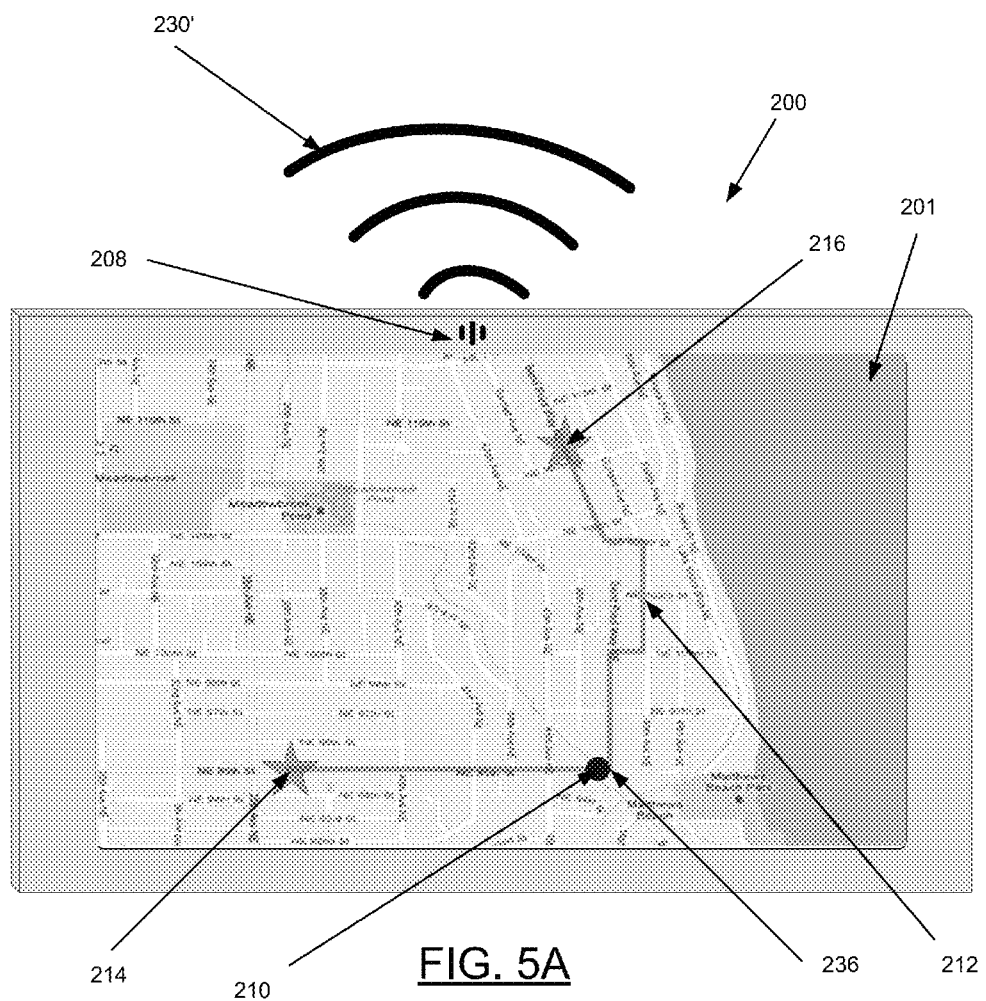
Figure 6:
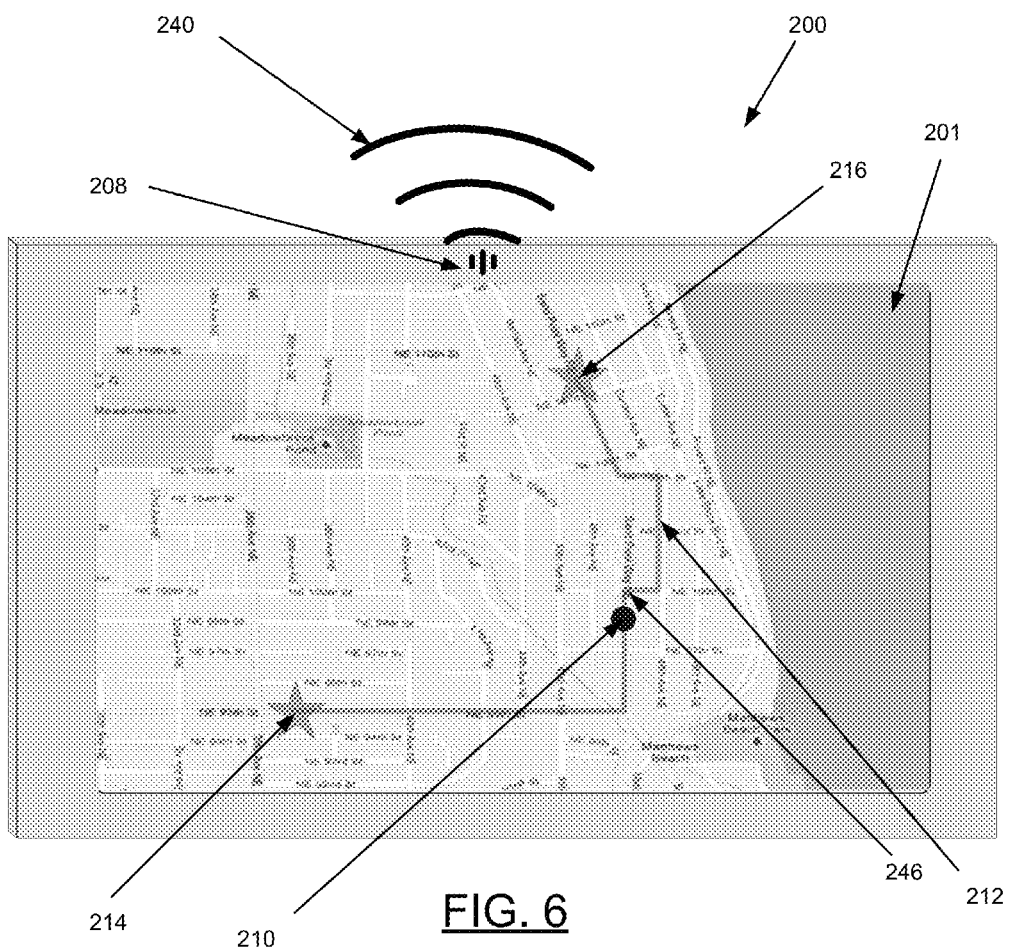
Figure 7:
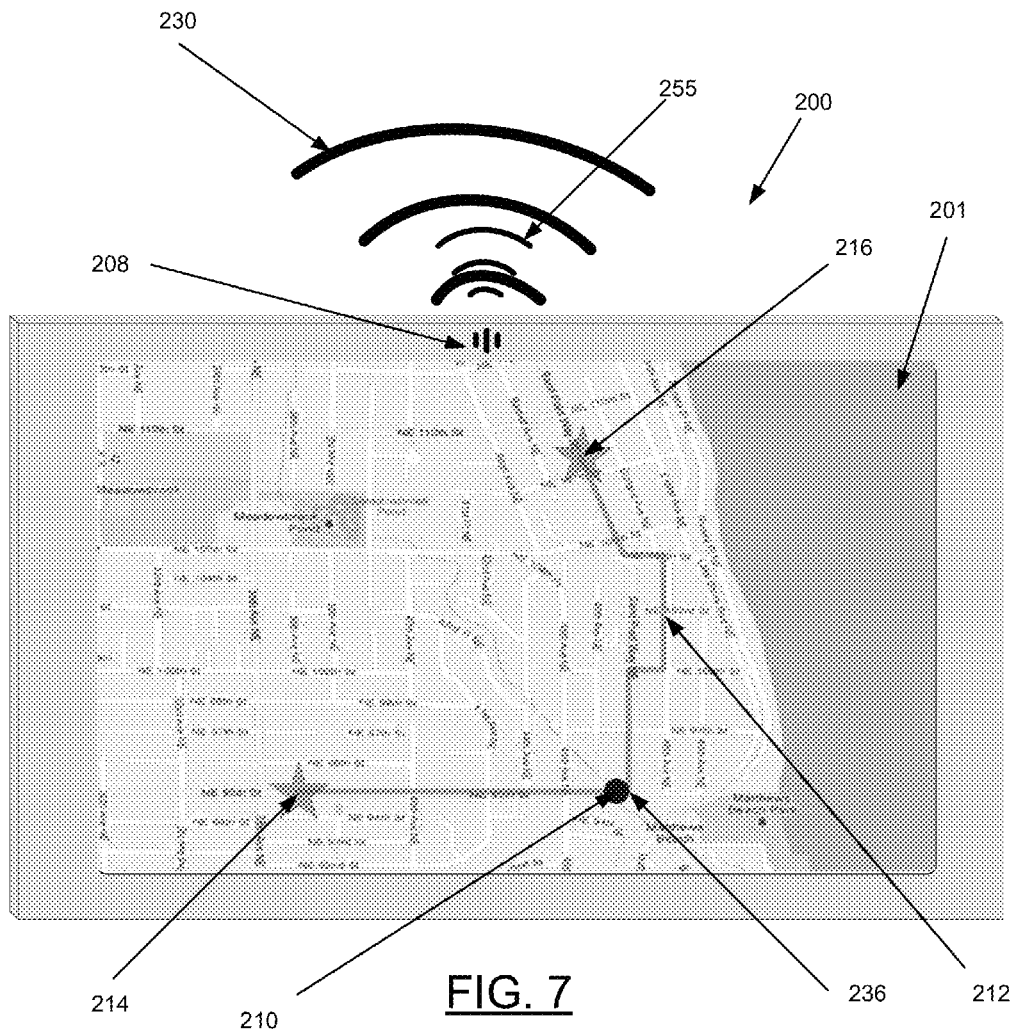
Figure 8:
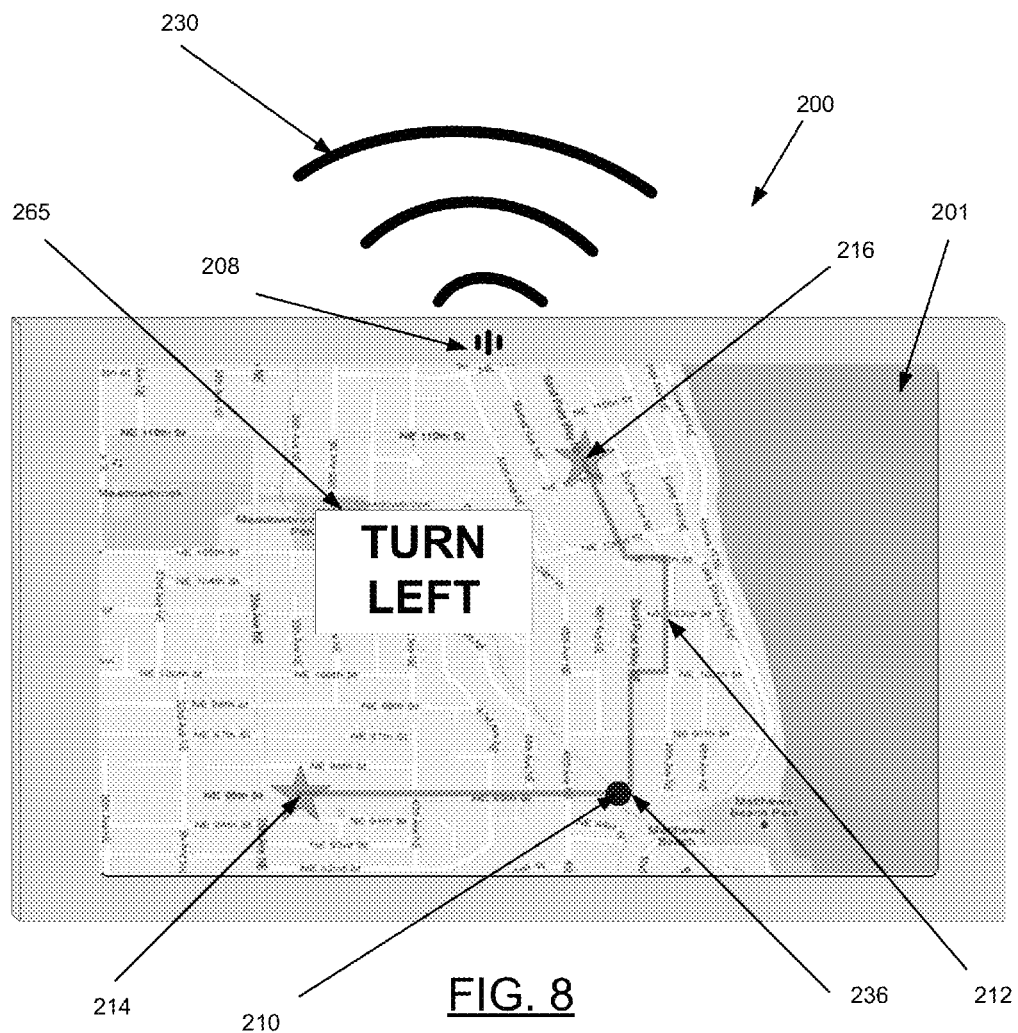
Figure 9:
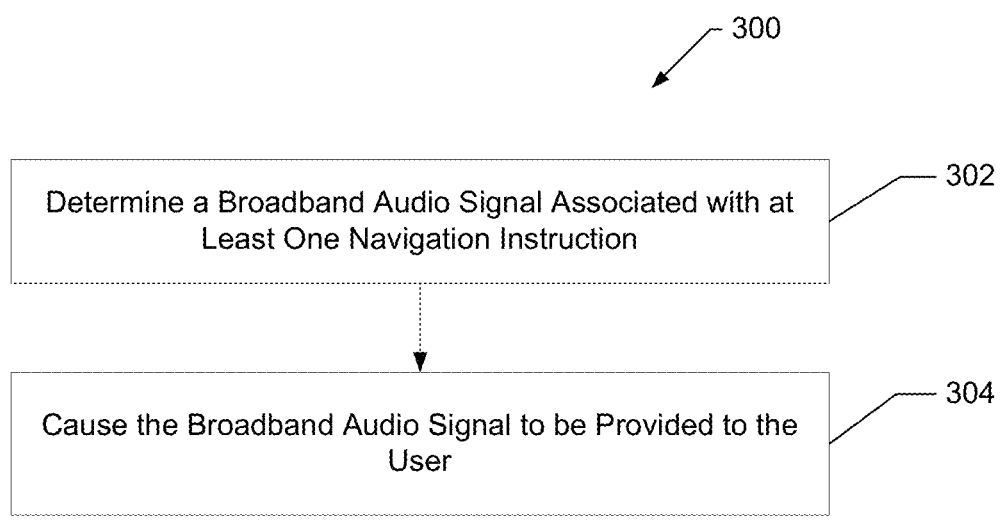
Figure 10:
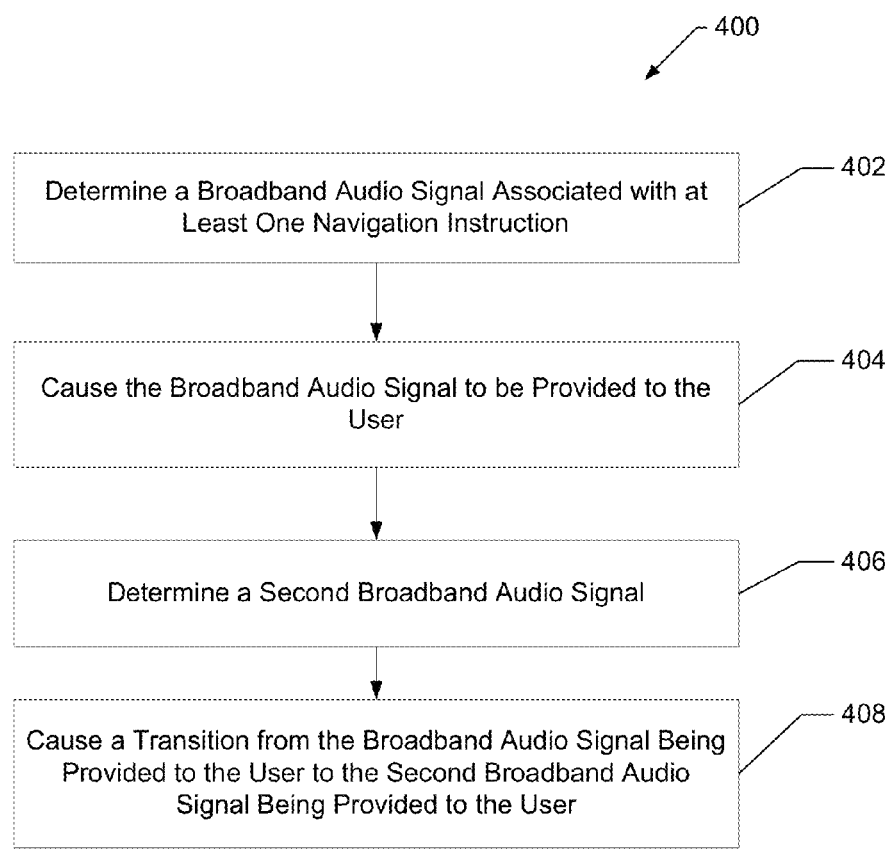
Figure 11:
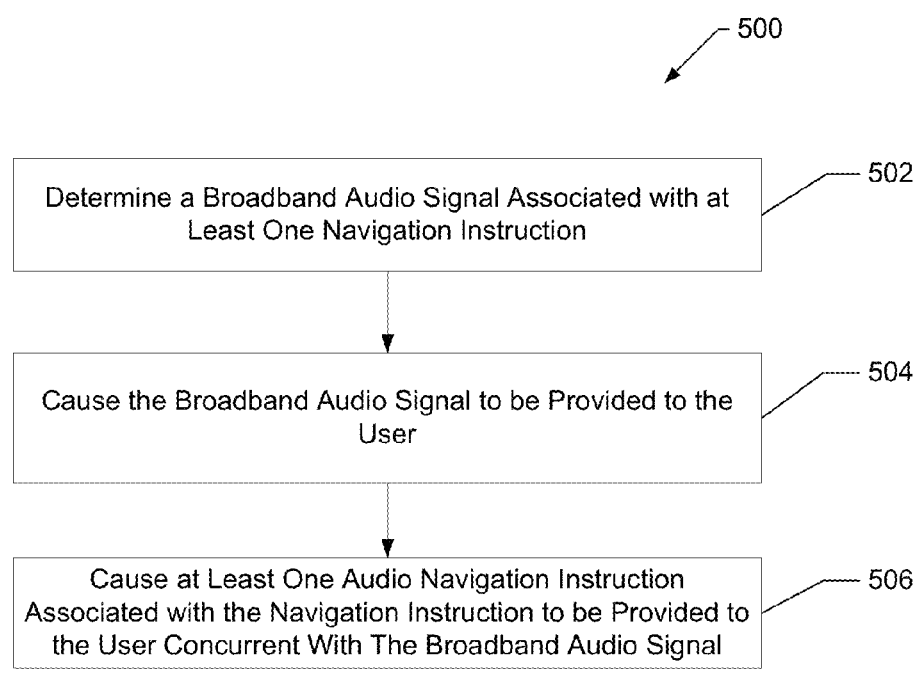
Figure 12:
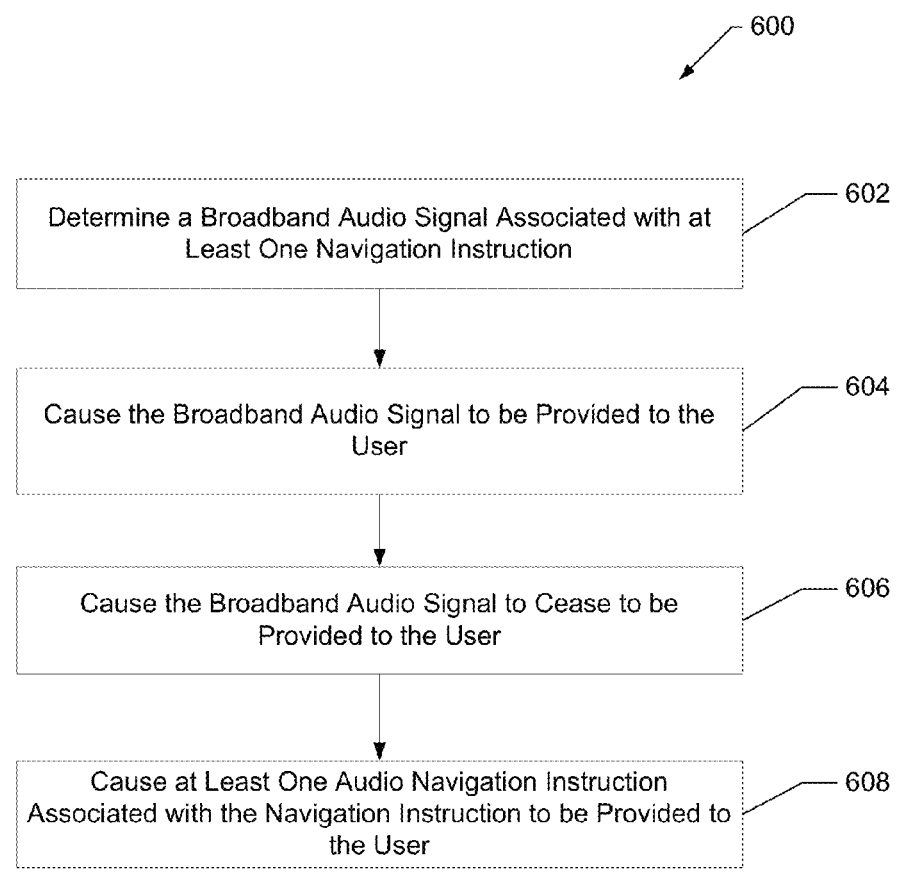
Figure 13:
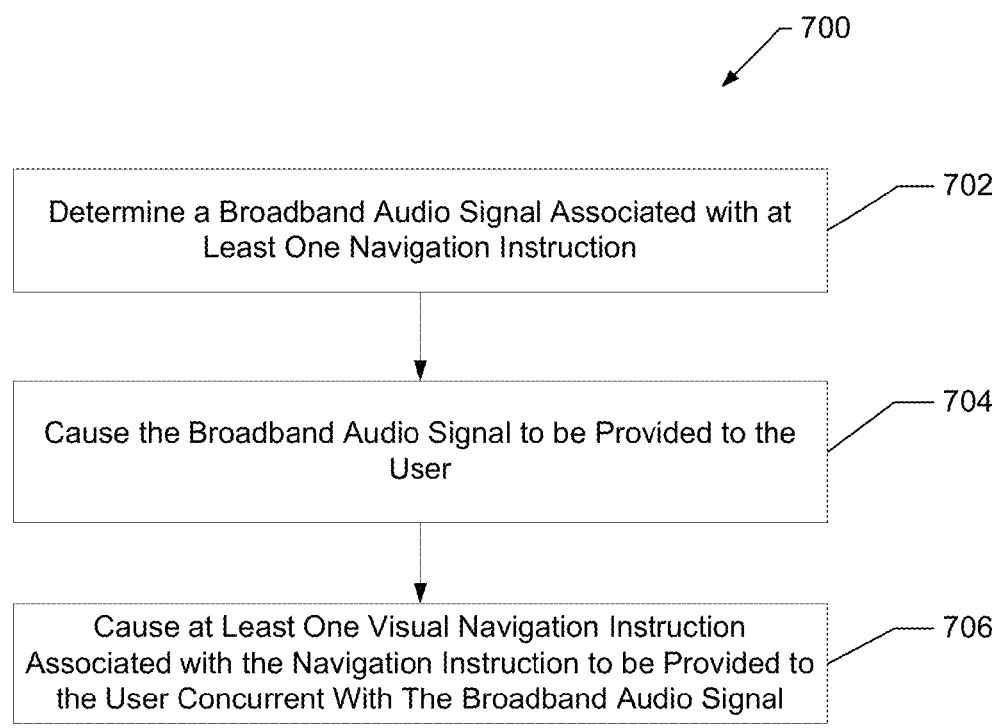

Having thus described some embodiments of the invention in general terms, reference will now be made to the accompanying drawings, which are not necessarily drawn to scale, and wherein:

FIG. 1 illustrates a block diagram of an apparatus according to an example embodiment of the present invention;

FIG. 2 is a schematic block diagram of a mobile terminal according to an example embodiment of the present invention;

FIG. 3 illustrates an example apparatus, such as the apparatus shown in FIG. 1, with a map with navigation information is being presented on a display, wherein a broadband audio signal is being provided to the user, in accordance with an example embodiment of the present invention described herein;

FIG. 4A illustrates a graph of sound intensity v. frequency for white noise, in accordance with an example embodiment of the present invention described herein;

FIG. 4B illustrates a graph of sound intensity v. frequency for pink noise, in accordance with an example embodiment of the present invention described herein;

FIG. 4C illustrates a graph of sound intensity v. frequency for blue noise, in accordance with an example embodiment of the present invention described herein;

FIG. 5 illustrates the map shown in FIG. 3, wherein the user is approaching a left turn along a route displayed on the map, wherein another broadband audio signal is being provided to the user, in accordance with an example embodiment of the present invention described herein;

FIG. 5A illustrates the map shown in FIG. 5, wherein the user is closer to the approaching left turn, wherein the broadband audio signal is being provided to the user at an increased volume, in accordance with an example embodiment of the present invention described herein;

FIG. 6 illustrates the map shown in FIG. 3, wherein the user is approaching a right turn along a route displayed on the map, wherein yet another broadband audio signal is being provided to the user, in accordance with an example embodiment of the present invention described herein;

FIG. 7 illustrates the map shown in FIG. 3, wherein the user is approaching a left turn along a route displayed on the map, wherein a broadband audio signal and an audio navigation instruction are both being provided to the user, in accordance with an example embodiment of the present invention described herein;

FIG. 8 illustrates the map shown in FIG. 3, wherein the user is approaching a left turn along a route displayed on the map, wherein a broadband audio signal and a visual navigation instruction are both being provided to the user, in accordance with an example embodiment of the present invention described herein;

FIG. 9 illustrates a flowchart according to an example method for providing broadband audio signals associated with navigation instructions, in accordance with an example embodiment of the present invention described herein;

FIG. 10 illustrates a flowchart according to another example method for providing broadband audio signals associated with navigation instructions, in accordance with an example embodiment of the present invention described herein;

FIG. 11 illustrates a flowchart according to yet another example method for providing broadband audio signals associated with navigation instructions, in accordance with an example embodiment of the present invention described herein;

FIG. 12 illustrates a flowchart according to yet another example method for providing broadband audio signals associated with navigation instructions, in accordance with an example embodiment of the present invention described herein; and FIG. 13 illustrates a flowchart according to yet another example method for providing broadband audio signals associated with navigation instructions, in accordance with an example embodiment of the present invention described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 configured for providing broadband audio signals associated with navigation instructions according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for performing operations and operational routing, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a user interface (e.g., a touch display capable of displaying a graphical user interface). In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000

(CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of communicating according to Wi-Fi, Near Field Communications (NFC), BlueTooth, Worldwide Interoperability for Microwave Access (WiMAX) or other proximity-based communications protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. Additionally or alternatively, the communication interface 114 may be configured to support communications in accordance with any proximity-based protocol including, for example, Wi-Fi, NFC, BlueTooth, WiMAX or the like. The communication interface 114 may additionally be in communication with the memory 112, user interface 116, and/or UI control circuitry 122, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touchscreen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, and/or UI control circuitry 122, such as via a bus.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display (e.g., touchscreen). The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

As noted above, the apparatus 102 (shown in FIG. 1) may be configured to perform operations. Indeed, in some embodiments, the apparatus 102 may be configured to function as a navigation system that provides geographical and/or travel information for a user, such as provide directions to the user. In some embodiments, the apparatus 102 may be configured to cause calculation of a route in a map. For example, the user may input a starting location and/or a destination. Then, based on available map data (e.g., from a server or local database), the apparatus 102 may be configured to calculate a route between the starting location and the destination.

In some embodiments, the apparatus 102 (shown in FIG. 1) may be configured to cause presentation of the map, such as on user interface 116. Moreover, in some embodiments, the apparatus 102 may be configured to cause presentation of the calculated route on the map. For example, with reference to FIG. 3, an apparatus 200 may present a portion of a map on a display 201. The apparatus 200 may also present a route 212 on the map. In the depicted embodiment, the route 212 extends from a starting location 214 to a destination 216.

In some embodiments, the apparatus 102, such as through the user interface 116, may be configured to provide navigation instructions to a user. Such navigation instructions may be related to the navigation function of the apparatus 102. Some example navigation instructions include turn left, stay on the current path, turn right, upcoming turn, etc.

Though example embodiments described herein illustrate display of a map and a corresponding route, some embodiments of the present invention do not necessarily need to present the map and/or the route. Indeed, some embodiments of the present invention may be utilized without presentation of navigation information at all.

Considering the usefulness of the above noted navigation features and the ability of users to carry mobile computing devices (e.g., apparatus 102 shown in FIG. 1), users may now rely on their mobile computing devices to get where they need to go. Often, the users may even attempt to utilize the navigation function while driving. In such situations, audio and/or visual navigation instructions may cause unwanted distractions. For example, it may be dangerous for a user to glance at a navigation screen to receive a visual navigation instruction. Indeed, a user may repeatedly look at the navigation screen to, inter alia, (i) ensure that the user has not deviated from the route; (ii) determine how far the user is from a location associated with an upcoming navigation instruction; and/or (iii) determine the direction of an upcoming navigation instruction.

Along these same lines, an audio navigation instruction may interfere with the ability of the user to listen to other sounds, such as traffic, sirens, music, conversation, etc. Likewise, such other sounds may interfere with the audio navigation instruction, thereby making it difficult for the user to receive the navigation instruction.

As such, example embodiments of the present invention seek to provide navigation instructions with limited distraction to the user. Indeed, in some embodiments, a user may receive a navigation instruction in a way that allows the user to understand the navigation instruction without being distracted from their current task, such as may occur if the user were to look at a visual navigation instruction or listen to an audio navigation instruction. In such a regard, the user may easily discern the navigation instruction while maintaining concentration on their current task. Along these lines, some embodiments of the present invention relate to methods, apparatuses, and computer program products for providing broadband audio signals associated with navigation instructions.

As used herein, the term "navigation instruction" may refer to navigation instructions that include commands (e.g., "turn left", "continue along this path", etc.). In contrast, a broadband audio signal associated with a navigation instruction may not include a command. Instead, the broadband audio signal, in some embodiments, may be associated with a command such that when a user hears the broadband audio signal, they will know the associated navigation instruction and, thereby, the navigation instruction will be conveyed to the user in a less distracting way.

In some embodiments, a broadband audio signal may be a representation of an audio signal with components in all frequencies capable of being broadcast by a speaker (e.g., a conventional speaker). Additionally or alternatively, in some embodiments, a broadband audio signal may be a representation of an audio signal with components in all frequencies capable of being perceived (e.g., by a human, such as the user). Said differently, the broadband audio signal may have characteristics that cause a user to hear an audio signal that appears to be broadcasting in all frequencies. In such a manner, the broadband audio signal, in some cases, may actually be only broadcast over a certain band of frequencies. Along these same lines, the broadband audio signal may be broadcast such that certain select frequencies are not covered. However, as noted above, the broadband audio signal may still be representative of a broadband audio signal to a user.

Some example broadband audio signals include white noise, pink noise, blue noise, brown noise, among others. White noise is a signal with equal power in any band of a given bandwidth (power spectral density). For example, with a white noise audio signal, the range of frequencies between 40 Hz and 60 Hz contains the same amount of sound power as the range between 400 Hz and 420 Hz. The power density of pink noise, compared with white noise, decreases by 3 dB per octave. In contrast, blue noise, compared with white noise, increases by 3 dB per octave. As such, there is an easy audible distinction between white noise, pink noise, and blue noise. Indeed, a user can easily distinguish between a pink noise signal, a white noise signal, and a blue noise signal. Graphs depicting sound intensity (dB) to frequency (Hz) for white noise, pink noise, and blue noise are illustrated in FIGS. 4A, 4B, and 4C.

In some embodiments, the apparatus 102, such as through the processor 110, may be configured to determine that at least one navigation instruction should be provided to a user. As noted above, the apparatus 102, may be configured to perform a navigation function. As such, the apparatus 102, may determine when a navigation instruction (e.g., turn left, continue along the current path, etc.) should be presented to the user. For example, with reference to FIG. 3, the user 210 may be travelling along a route 212, such as from a starting location 214 to an end location 216. In such a situation, the apparatus 200 may determine that the navigation instruction should be a "continue on the current path" instruction (e.g., continue to travel on the current street).

Though the above described example embodiment details a navigation instruction that includes the user staying on the current path, other navigation instructions are contemplated. Along these lines, other example navigation instructions include the following: turn left, turn right, stop, merge, destination in "X" miles, speed limit is "Y" mph, among others.

In some embodiments, the apparatus 102, such as through the processor 110, may be configured to determine a broadband audio signal associated with the navigation instruction. In some embodiments, the broadband audio signal may be chosen from a plurality of broadband audio signal candidates. In some embodiments, the apparatus 102, may be configured to determine a broadband audio signal associated with the navigation instruction from among the list of broadband audio signal candidates that includes: a white noise signal, a pink noise signal, and a blue noise signal. As an example, with reference to FIG. 3, the apparatus 200 may determine that a white noise signal is associated with the navigation instruction comprising a continue on the current path instruction.

In some embodiments, the apparatus 102, such as through the user interface 116, may be configured to cause a broadband audio signal to be provided to the user. For example, in some embodiments, the apparatus 102 may include one or more speakers configured to broadcast the broadband audio signal to the user. With reference to FIG. 3, the apparatus 200 may include a speaker 208 and may broadcast the broadband audio signal from the speaker 208. For example, the apparatus 200 may broadcast a white noise signal 220 in response to determining that the white noise signal is associated with the navigation instruction of stay on the current path.

As noted herein, in some embodiments the apparatus 102, such as through the processor 110, may be configured to determine other navigation instructions. For example, in some embodiments, the apparatus 102, such as through the processor 110, may be configured to determine that a navigation instruction may comprise an upcoming turn instruction. Additionally, the apparatus 102, such as through the processor 110, may be configured to determine that a broadband audio signal of either a pink noise signal or a blue noise signal is associated with the navigation instruction that the user should turn. For example, with reference to FIG. 4, the apparatus 200 may determine that the user 210 is approaching a left turn 326. As such, the apparatus 200 may determine that the navigation instruction should be a "turn" instruction (e.g., turn left ahead). Additionally, the apparatus 200 may determine that a one of a pink noise signal or a blue noise signal is associated with the navigation instruction comprising a turn instruction. For example, the apparatus 200 may determine that a pink noise signal is associated with a left turn instruction. Further, the apparatus 200 may broadcast the pink noise signal 230.

In some embodiments, the apparatus 102, such as through the processor 110, may be configured to determine, in an instance in which the navigation instruction is a left turn instruction, that a broadband audio signal of a pink noise signal is associated with the navigation instruction. Additionally, in some embodiments, the apparatus 102, such as through the processor 110, may be configured to determine, in an instance in which the navigation instruction is a right turn instruction, that a broadband audio signal of a blue noise signal is associated with the navigation instruction. In such an embodiment, the apparatus 102 may be configured to cause different broadband audio signals for different navigation instructions. Such an embodiment would allow a user to learn to associate the broadband audio signal with the appropriate navigation instruction, thereby allowing for easy determination of a navigation instruction by the user. For example, as shown with respect to FIG. 5, the apparatus 200 may determine a left turn instruction (such as at the left turn 236) and cause a broadband audio signal of a pink noise signal 230 to be provided to the user. Additionally, however, with reference to FIG. 6, after the user takes the left turn at 236, the location of the user 210 may approach a right turn 246. The apparatus 200 may determine a navigation instruction of a right turn instruction and, in response, cause a broadband audio signal of a blue noise signal 240 to be provided to the user. In such an embodiment, the user may travel along the route 212 with the broadband audio signals providing the necessary instructions.

As noted above, some example embodiments provide for associating certain broadband audio signals with certain navigation instructions. For example, a white noise signal may be associated with a continue on the current path instruction, a pink noise signal may be associated with a left turn instruction, and a blue noise signal may be associated with a right turn instruction. In some cases, such an association may be intuitive. For example, with reference to FIG. 4B, the pink noise signal has a relatively high frequency at a relatively low intensity (e.g., it is high on the left side of the graph). Additionally, the blue noise signal has a relatively high frequency at a relatively high intensity (e.g., it is high on the right side of the graph). As such, this provides for an intuitive concept of associating a pink noise signal with a left turn and a blue noise signal with a right turn.

Further, as noted in some embodiments above, the apparatus 102 may be configured to transition between different broadband audio signals based on changes in the navigation instruction. In such a regard, in some embodiments, the broadband audio signal may change between, for example, white noise and pink noise. In such an embodiment, the transition the user recognizes between a continue on the current path instruction (e.g., white noise signal) and either a turn left (e.g., pink noise signal) or a turn right (e.g., blue noise signal) may be intuitive. Indeed, a transition to a pink noise signal or a blue noise signal would be perceived as a deviation from the white noise signal, which corresponds to a deviation in the current path.

In some embodiments, the broadband audio signal may be broadcast to the user in a way that conveys additional information, such as how close the user is to a location associated with the navigation instruction. For example, how close the user is to the upcoming left turn. Along these lines, in some embodiments, the apparatus 102, such as through the processor 110 and/or user interface 116, may be configured to cause the broadband audio signal to be provided to the user based at least in part on a distance between the user and a location associated with the navigation instruction. Additionally, in some embodiments, the apparatus 102, such as through the processor 110 and/or user interface 116, may be configured to cause the broadband audio signal to be provided to the user at a volume level proportional to the distance between the user and the location associated with the navigation instruction. For example, with reference to FIG. 5, the apparatus 200 may provide the pink noise signal 230 at a pre-determined volume level (e.g., a minor level), thereby indicating that a left turn is approaching. Then, with reference to FIG. 5A, as the location of the user 210 approaches the location 236 associated with the left turn, the volume level of the pink noise signal 230' may increase, thereby indicating that the left turn is close.

In some embodiments, the at least one navigation instruction may be associated with more than one broadband audio signal (e.g., a first and second broadband audio signal). Along these lines, in some embodiments, the apparatus 102, such as through the processor 110, may be configured to determine a second broadband audio signal associated with the navigation instruction. Further, in some embodiments, the apparatus 102, such as through the processor 110 and/or user interface 116, may be configured to cause a transition from the broadband audio signal being currently provided to the user and the second broadband audio signal. For example, with reference to FIG. 5, the apparatus 200 may be configured to cause a white noise signal to be provided to the user, and as the location of the user 210 approaches the upcoming left turn 236, the apparatus 200 may transition from providing the white noise signal to providing a pink noise signal. In some embodiments, the transition may be defined by a transition rate that is proportional to the distance between the location of the user 210 and a location associated with the navigation instruction (e.g., the location of the left turn 236). As such, as the location of the user 210 draws nearer to the left turn 236, the pink noise signal becomes more distinct and overpowering of the white noise signal. This may continue until the user needs to make the left turn, at which point, the pink noise signal may be the only broadband audio signal being provided to the user.

In another example, the apparatus 102 may be configured cause a first broadband audio signal (e.g., a pink noise signal) to be provided to the user as the user approaches the location associated with the navigation instruction (e.g., the intersection of the left turn). Then, once the user reaches the location, the apparatus 102 may be configured to cause a second broadband audio signal (e.g., a white noise signal) to be provided to the user. Further, should the user travel past the location of the navigation instruction (e.g., miss the left turn), the apparatus 102 may be configured to cause a third broadband audio signal (e.g., a blue noise). In such a regard, a Doppler Effect type broadband audio signal system may help the user easily recognize when they miss a turn. In some embodiments, the apparatus 102 may be configured to cause a transition between broadcasting of the broadband audio signal. Additionally, in some embodiments, the apparatus 102 may be configured to cause the transition to occur at a transition rate proportional to the distance between the location of the user and the location associated with the navigation instruction.

In some embodiments, the apparatus 102 may be configured to provide a transition between broadband audio signals for different navigation instructions. In such a manner, the user may become aware of a changing navigation instruction. Along these lines, in some embodiments, the apparatus 102, such as through the processor 110, may be configured to determine that a second broadband audio signal is associated with at least one second navigation instruction. Further, in some embodiments, the apparatus 102, such as through the processor 110 and/or user interface 116, may be configured to cause a transition from the broadband audio signal being currently provided to the user and the second broadband audio signal. For example, with reference to FIG. 3, the apparatus 200 may determine that the navigation instruction is a continue on the current path instruction and, thus, cause a white noise signal 220 to be provided to the user. However, with reference to FIG. 5, as the user (e.g., the location of the user 210) approaches an upcoming left turn 236, the apparatus 200 may determine that the navigation instruction is an upcoming turn instruction. Thus, the apparatus 200 may be configured to cause a transition from the white noise signal to a pink noise signal. In some embodiments, the transition may be defined by a transition rate that is proportional to the distance between the location of the user 210 and a location associated with the navigation instruction (e.g., the location of the left turn 236). As such, as the location of the user 210 draws nearer to the left turn 236, the pink noise signal becomes more distinct and overpowering of the white noise signal. This may continue until the user needs to make the left turn, at which point, the pink noise signal may be the only broadband audio signal being provided to the user.

In some embodiments, the apparatus 102, such as through the user interface 116, may be configured to cause audio navigation instructions associated with the navigation instruction to be provided to the user. For example, the apparatus 102 may be configured to provide an audio navigation instruction that instructs the user to perform an action, such as "Turn Left."

In some embodiments, the apparatus 102, such as through the user interface 116, may be configured to cause at least one audio navigation instruction associated with the navigation instruction to be provided to the user concurrent with causing the broadband audio signal to be provided to the user. In such a regard, the broadband audio signal and the audio navigation instruction may be provided to the user at the same time. For example, with reference to FIG. 7, the apparatus 200 may determine, such as based on the location of the user 210, that the navigation instruction of a left turn should be provided to the user. As such, the apparatus 200 may cause a pink noise signal 230 (e.g., the associated broadband audio signal) to be provided to the user. Additionally, the apparatus 200 may cause an audio navigation instruction, such as a broadcast of the instruction "Turn Left" 255 to also be provided to the user. Since the broadband audio signal is not disruptive, the user can still understand the audio navigation instruction and be properly instructed.

In some embodiments, the apparatus 102 may be configured to cease broadcasting of the broadband audio signal while the audio navigation instructions are being broadcast. For example, in some embodiments, the apparatus 102, such as through the user interface 116, may be configured to cause at least one audio navigation instruction associated with the navigation instruction to be provided to the user. Additionally, the apparatus 102, such as through the user interface 116, may also be configured to cause the broadband audio signal to cease to be provided to the user concurrent with causing the at least one audio navigation instruction to be provided to the user. For example, in contrast to the embodiment shown in FIG. 7, as the location of the user 210 approaches the left turn 236, the apparatus 200 may cease broadcasting of the broadband audio signal 230 and beginning broadcasting of the audio navigation instruction 255. In such an example embodiment, the user may receive an indication of an upcoming navigation instruction (such as by hearing the broadband audio signal) and, then, when the navigation instruction is pertinent and/or imminent, the user may be able to easily hear the audio navigation instruction.

In some embodiments, the apparatus 102, such as through the user interface 116, may be configured to cause visual navigation instructions associated with the navigation instruction to be provided to the user. For example, the apparatus 102 may be configured to provide a visual navigation instruction that instructs the user to perform an action, such as "Turn Left."

In some embodiments, the apparatus 102, such as through the user interface 116, may be configured to cause at least one visual navigation instruction associated with the navigation instruction to be provided to the user concurrent with causing the broadband audio signal to be provided to the user. In such a regard, the broadband audio signal and the visual navigation instruction may be provided to the user at the same time. For example, with reference to FIG. 8, the apparatus 200 may determine, such as based on the location of the user 210, that the navigation instruction of a left turn should be provided to the user. As such, the apparatus 200 may cause a pink noise signal 230 (e.g., the associated broadband audio signal) to be provided to the user. Additionally, the apparatus 200 may cause a visual navigation instruction, such as by causing presentation of the instruction "Turn Left" 265 to be provided to the user on the screen 201. In such an example embodiment, the user may receive an indication of an upcoming navigation instruction (such as by hearing the broadband audio signal), which may also inform the user that a visual navigation instruction is being displayed.

Embodiments of the present invention provide methods, apparatus and computer program products for providing broadband audio signals associated with navigation instructions. Various examples of the operations performed in accordance with embodiments of the present invention will now be provided with reference to FIGS. 9-13.

FIG. 9 illustrates a flowchart according to an example method for providing broadband audio signals associated with navigation instructions according to an example embodiment 300. The operations illustrated in and described with respect to FIG. 9 may, for example, be performed by, with the assistance of, and/or under the control of one or more of the processor 110, memory 112, communication interface 114, user interface 116, or UI control circuitry 122 (shown in FIG. 1). Operation 302 may comprise determining a broadband audio signal associated with at least one navigation instruction. The processor 110 may, for example, provide means for performing operation 302. Operation 304 may comprise causing the broadband audio signal to be provided to the user. The user interface 116 may, for example, provide means for performing operation 304.

FIG. 10 illustrates a flowchart according to another example method for providing broadband audio signals associated with navigation instructions according to an example embodiment 400. The operations illustrated in and described with respect to FIG. 10 may, for example, be performed by, with the assistance of, and/or under the control of one or more of the processor 110, memory 112, communication interface 114, user interface 116, or UI control circuitry 122 (shown in FIG. 1). Operation 402 may comprise determining a broadband audio signal associated with at least one navigation instruction. The processor 110 may, for example, provide means for performing operation 402. Operation 404 may comprise causing the broadband audio signal to be provided to the user. The user interface 116 may, for example, provide means for performing operation 404. Operation 406 may comprise determining a second broadband audio signal. The processor 110 may, for example, provide means for performing operation 406. Operation 408 may comprise causing a transition from the broadband audio signal being provided to the user to the second broadband audio signal to be provided to the user. The user interface 116 may, for example, provide means for performing operation 408.

FIG. 11 illustrates a flowchart according to yet another example method for providing broadband audio signals associated with navigation instructions according to an example embodiment 500. The operations illustrated in and described with respect to FIG. 11 may, for example, be performed by, with the assistance of, and/or under the control of one or more of the processor 110, memory 112, communication interface 114, user interface 116, or UI control circuitry 122 (shown in FIG. 1). Operation 502 may comprise determining a broadband audio signal associated with at least one navigation instruction. The processor 110 may, for example, provide means for performing operation 502. Operation 504 may comprise causing the broadband audio signal to be provided to the user. The user interface 116 may, for example, provide means for performing operation 504. Operation 506 may comprise causing at least one audio navigation instruction associated with the navigation instruction to be provided to the user concurrent with the broadband audio signal. The user interface 116 may, for example, provide means for performing operation 506.

FIG. 12 illustrates a flowchart according to yet another example method for providing broadband audio signals associated with navigation instructions according to an example embodiment 600. The operations illustrated in and described with respect to FIG. 12 may, for example, be performed by, with the assistance of, and/or under the control of one or more of the processor 110, memory 112, communication interface 114, user interface 116, or UI control circuitry 122 (shown in FIG. 1). Operation 602 may comprise determining a broadband audio signal associated with at least one navigation instruction. The processor 110 may, for example, provide means for performing operation 602. Operation 604 may comprise causing the broadband audio signal to be provided to the user. The user interface 116 may, for example, provide means for performing operation 604. Operation 606 may comprise causing the broadband audio signal to cease to be provided to the user. The user interface 116 may, for example, provide means for performing operation 606. Operation 608 may comprise causing at least one audio navigation instruction associated with the navigation instruction to be provided to the user. The user interface 116 may, for example, provide means for performing operation 608.

FIG. 13 illustrates a flowchart according to yet another example method for providing broadband audio signals associated with navigation instructions according to an example embodiment 700. The operations illustrated in and described with respect to FIG. 13 may, for example, be performed by, with the assistance of, and/or under the control of one or more of the processor 110, memory 112, communication interface 114, user interface 116, or UI control circuitry 122 (shown in FIG. 1). Operation 702 may comprise determining a broadband audio signal associated with at least one navigation instruction. The processor 110 may, for example, provide means for performing operation 702. Operation 704 may comprise causing the broadband audio signal to be provided to the user. The user interface 116 may, for example, provide means for performing operation 704. Operation 706 may comprise causing at least one visual navigation instruction associated with the navigation instruction to be provided to the user concurrent with the broadband audio signal. The user interface 116 may, for example, provide means for performing operation 706.

FIGS. 9-13 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method for outputting broadband audio signals associated with navigation instructions to a user, the method comprising:
   determining, by a processor, an instance in which a first navigation instruction is to be provided to the user;
   determining that a first broadband audio signal is associated with the first navigation instruction;
   causing the first broadband audio signal to be outputted through at least one speaker to the user;
   determining an instance in which the second navigation instruction is to be provided to the user;
   determining that a second broadband audio signal is associated with the second navigation instruction; and
   causing a transition from the first broadband audio signal being outputted through the at least one speaker to the user to the second broadband audio signal being outputted through the at least one speaker to the user.

2. The method according to claim 1, wherein the broadband audio signal comprises a representation of an audio signal with components in all frequencies capable of being broadcast by a speaker.

3. The method according to claim 1, wherein, in an instance in which the first navigation instruction comprises a continue on the current path instruction, the first broadband audio signal is a white noise signal.

4. The method according to claim 1, wherein, in an instance in which the second navigation instruction comprises a turn instruction, the second broadband audio signal is one of a pink noise signal or a blue noise signal.

5. The method according to claim 1, wherein, in an instance in which the first navigation instruction comprises a turn in a predefined direction instruction, the first broadband audio signal is a pink noise signal.

6. The method according to claim 5, wherein, in an instance in which the second navigation instruction comprises a turn in a second predefined direction instruction, the second broadband audio signal is a blue noise signal.

7. The method according to claim 1, wherein causing the first broadband audio signal to be provided to the user comprises causing the first broadband audio signal to be provided based at least in part on a distance between the user and a location associated with the first navigation instruction.

8. The method according to claim 7, wherein causing the first broadband audio signal to be provided to the user comprises causing the first broadband audio signal to be provided at a volume level proportional to the distance between the user and the location associated with the first navigation instruction.

9. The method according to claim 1, wherein causing the transition comprises causing the transition from the broadband audio signal being provided to the user to the second broadband audio signal being provided to the user at a transition rate proportional to a distance between the user and a location associated with the second navigation instruction.

10. The method according to claim 1 further comprising causing at least one audio navigation instruction associated with the first navigation instruction to be provided to the user concurrent with causing the first broadband audio signal to be provided to the user.

11. The method according to claim 1 further comprising:
causing at least one audio navigation instruction associated with the first navigation instruction to be provided to the user; and
causing the first broadband audio signal to cease to be provided to the user concurrent with causing the at least one audio navigation instruction to be provided to the user.

12. The method according to claim 1 further comprising causing at least one visual navigation instruction associated with the first navigation instruction to be provided to the user concurrent with causing the first broadband audio signal to be provided to the user.

13. The apparatus of claim 12, wherein the non-transitory memory and the computer program code are further configured to, with the processor, cause the apparatus to cause the first broadband audio signal to be provided to the user by causing the first broadband audio signal to be provided based at least in part on a distance between the user and a location associated with the first navigation instruction.

14. An apparatus for outputting broadband audio signals associated with navigation instructions to a user, the apparatus comprising at least one processor and at least one non-transitory memory including computer program code, the at least one non-transitory memory and the computer program code configured to, with the processor, cause the apparatus to:
determine an instance in which a first navigation instruction is to be provided to the user;
determine that a first broadband audio signal is associated with the first navigation instruction;
cause the first broadband audio signal to be outputted through at least one speaker to the users;
determine an instance in which the second navigation instruction is to be provided to the user;
determine that a second broadband audio signal is associated with the second navigation instruction; and
cause a transition from the first broadband audio signal being outputted through the at least one speaker to the user to the second broadband audio signal being outputted through the at least one speaker to the user.

15. The apparatus of claim 14, wherein the non-transitory memory and the computer program code are further configured to, with the processor, cause the apparatus to cause the transition by causing the transition from the broadband audio signal being provided to the user to the second broadband audio signal being provided to the user at a transition rate proportional to a distance between the user and a location associated with the second navigation instruction.

16. Computer program product for outputting broadband audio signals associated with navigation instructions to a user, the computer program product comprising a non-transitory computer readable medium having program code portions stored thereon, the program code portions being a computer readable medium and configured when said program product is run on a computer or network device, to:
determine an instance in which a first navigation instruction is to be provided to the user;
determine that a first broadband audio signal is associated with the first navigation instruction;
cause the first broadband audio signal to be outputted through at least one speaker to the user;
determine an instance in which the second navigation instruction is to be provided to the user;
determine that a second broadband audio signal is associated with the second navigation instruction; and
cause a transition from the first broadband audio signal being outputted through the at least one speaker to the user to the second broadband audio signal being outputted through the at least one speaker to the user.

17. The computer program product of claim 16, wherein the program code portions are configured when said program product is run on a computer or network device, to cause the transition by causing the transition from the broadband audio signal being provided to the user to the second broadband audio signal being provided to the user at a transition rate proportional to a distance between the user and a location associated with the second navigation instruction.

* * * * *